United States Patent
Damm et al.

(10) Patent No.: US 9,887,603 B2
(45) Date of Patent: Feb. 6, 2018

(54) WET-RUNNING CENTRIFUGAL PUMP

(71) Applicant: GRUNDFOS HOLDING A/S, Bjerringbro (DK)

(72) Inventors: Therkel Damm, Silkeborg (DK); Søren Bøndergaard, Skanderborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 345 days.

(21) Appl. No.: 14/367,523

(22) PCT Filed: Dec. 20, 2012

(86) PCT No.: PCT/EP2012/076462
§ 371 (c)(1),
(2) Date: Jun. 20, 2014

(87) PCT Pub. No.: WO2013/092902
PCT Pub. Date: Jun. 27, 2013

(65) Prior Publication Data
US 2015/0211525 A1     Jul. 30, 2015

(30) Foreign Application Priority Data

Dec. 23, 2011   (EP) .................................... 11195636
Aug. 17, 2012   (EP) .................................... 12180810

(51) Int. Cl.
*F04D 13/06* (2006.01)
*F04D 29/046* (2006.01)
(Continued)

(52) U.S. Cl.
CPC ................. *H02K 5/22* (2013.01); *F04D 1/00* (2013.01); *F04D 13/0606* (2013.01);
(Continued)

(58) Field of Classification Search
CPC ...... F04D 1/00; F04D 13/063; F04D 13/0686; F04D 13/0693; F04D 29/046;
(Continued)

(56) References Cited

U.S. PATENT DOCUMENTS 3,128,712 A * 4/1964 Sence ................. F04D 13/0613
310/86
3,667,870 A   6/1972 Yoshida et al.
(Continued)

FOREIGN PATENT DOCUMENTS

DE   18 02 561 A1   5/1970
DE   1 907 379 A1   9/1970
(Continued)

OTHER PUBLICATIONS

English translation of DE 2048467 (Hanning) obtained frm espace on Jul. 14, 2016.*
(Continued)

*Primary Examiner* — Devon Kramer
*Assistant Examiner* — Connor Tremarche
(74) *Attorney, Agent, or Firm* — McGlew and Tuttle, P.C.

(57) ABSTRACT

A wet-running centrifugal pump includes an electric motor (1) and a centrifugal pump (7) which is driven thereby. The electric motor (1) has a rotor (4) which is rotatably arranged within the stator (3). A canned pot (13), which carries a motor-side bearing for the rotor (4), is provided between the rotor and the stator. Moreover, a bearing plate (19) is provided, which carries a pump-side bearing for the rotor (4), wherein the bearing plate (19) is fixed on the housing side, and in the region of the pump-side bearing immerses into the canned pot. A radial seal (20) is provided between the bearing plate (19) and the canned pot (13).

15 Claims, 4 Drawing Sheets

(51) Int. Cl.
    F04D 29/08    (2006.01)
    F04D 1/00     (2006.01)
    H02K 5/22     (2006.01)
    H02K 5/04     (2006.01)
    H02K 5/128    (2006.01)
    H02K 9/22     (2006.01)
    H02K 5/167    (2006.01)
    F04D 29/58    (2006.01)
    H02K 7/08     (2006.01)

(52) U.S. Cl.
    CPC ..... *F04D 13/0633* (2013.01); *F04D 13/0686* (2013.01); *F04D 13/0693* (2013.01); *F04D 29/046* (2013.01); *F04D 29/086* (2013.01); *F04D 29/5813* (2013.01); *H02K 5/04* (2013.01); *H02K 5/128* (2013.01); *H02K 5/1672* (2013.01); *H02K 5/225* (2013.01); *H02K 9/22* (2013.01); *H02K 7/083* (2013.01); *H02K 2205/09* (2013.01)

(58) Field of Classification Search
    CPC ..... F04D 29/086; F04D 29/5813; F16J 15/02; F16J 15/447; H02K 5/04; H02K 5/128; H02K 5/1672; H02K 5/22; H02K 5/225; H02K 7/083; H02K 9/22
    USPC .................................................... 417/423.7
    See application file for complete search history.

(56) References Cited

U.S. PATENT DOCUMENTS

| | | | | |
|---|---|---|---|---|
| 4,786,238 A | * | 11/1988 | Glaser | F01D 25/125 415/175 |
| 6,028,386 A | * | 2/2000 | Kech | H02K 3/47 310/194 |
| 6,091,174 A | * | 7/2000 | Genster | F04D 29/588 310/52 |
| 7,370,865 B2 | * | 5/2008 | Vik | B62D 55/15 277/380 |
| 2006/0043916 A1 | * | 3/2006 | Henslee | H02P 25/18 318/432 |
| 2006/0270262 A1 | * | 11/2006 | Schmidt | H01R 13/5219 439/271 |
| 2010/0090635 A1 | * | 4/2010 | Andersen | F04D 29/628 318/490 |
| 2011/0033321 A1 | * | 2/2011 | Mikkelsen | H02K 5/1285 417/410.1 |
| 2011/0123317 A1 | * | 5/2011 | Schmidt | F04D 29/167 415/170.1 |

FOREIGN PATENT DOCUMENTS

| | | | | |
|---|---|---|---|---|
| DE | 16 13 154 A1 | 8/1971 | | |
| DE | 20 48 467 A1 | 11/1971 | | |
| DE | 2048467 A1 | * 11/1971 | ......... | F04D 13/0613 |
| DE | 2 207 647 A1 | 8/1973 | | |
| DE | 2207647 A1 | * 8/1973 | ............ | H02K 5/128 |
| DE | 199 43 862 A1 | 3/2001 | | |
| DE | 19943862 A1 | * 3/2001 | ......... | F04D 13/0613 |
| DE | 101 44 653 A1 | 4/2003 | | |
| FR | 2 262 433 A1 | 9/1975 | | |
| JP | H06 105501 A | 4/1994 | | |
| NL | 136 978 C | 10/1972 | | |

OTHER PUBLICATIONS

English Translation of DE 2207647 A1 (Halm) obtained on Nov. 3, 2016.*
English Translation of DE 19983862 obtained May 4, 2017.*

* cited by examiner

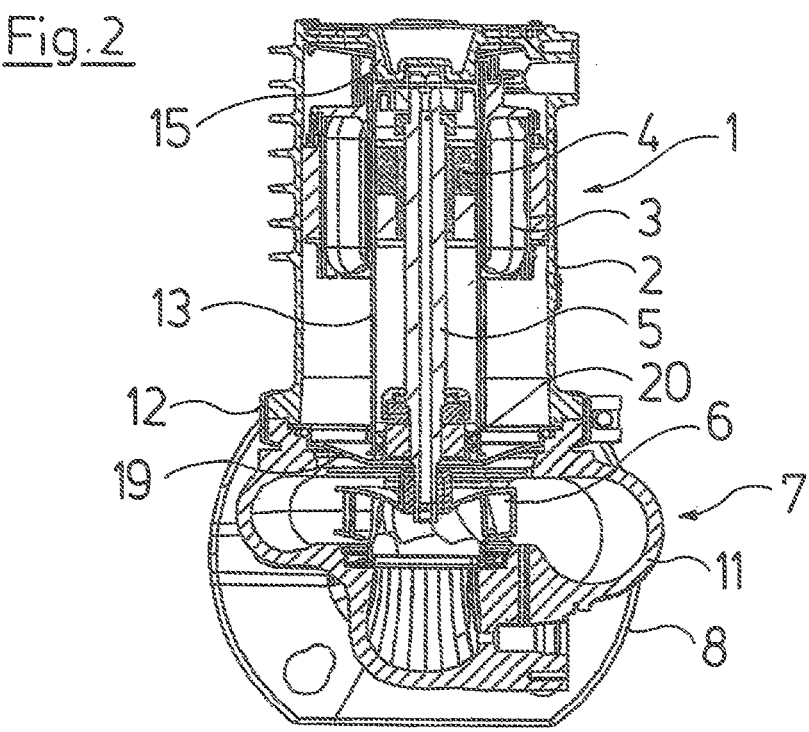
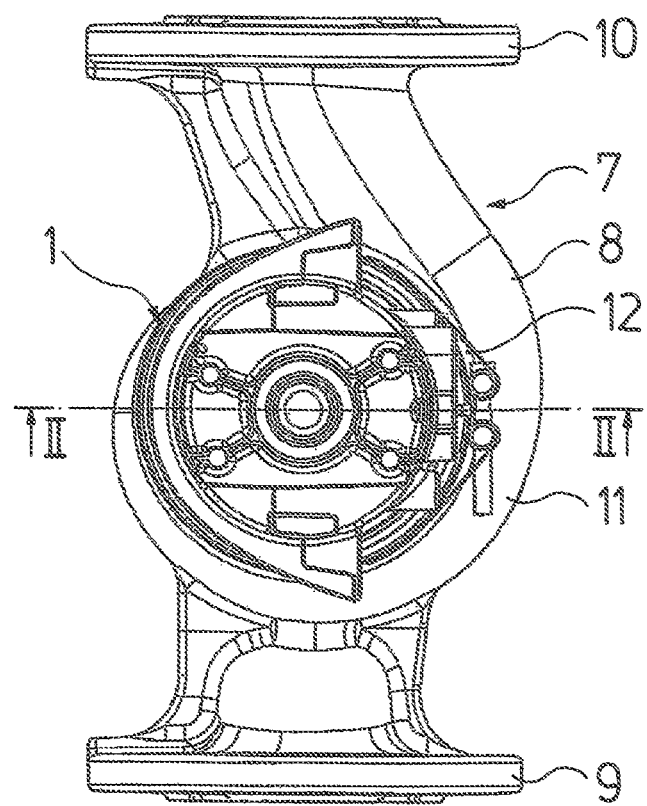

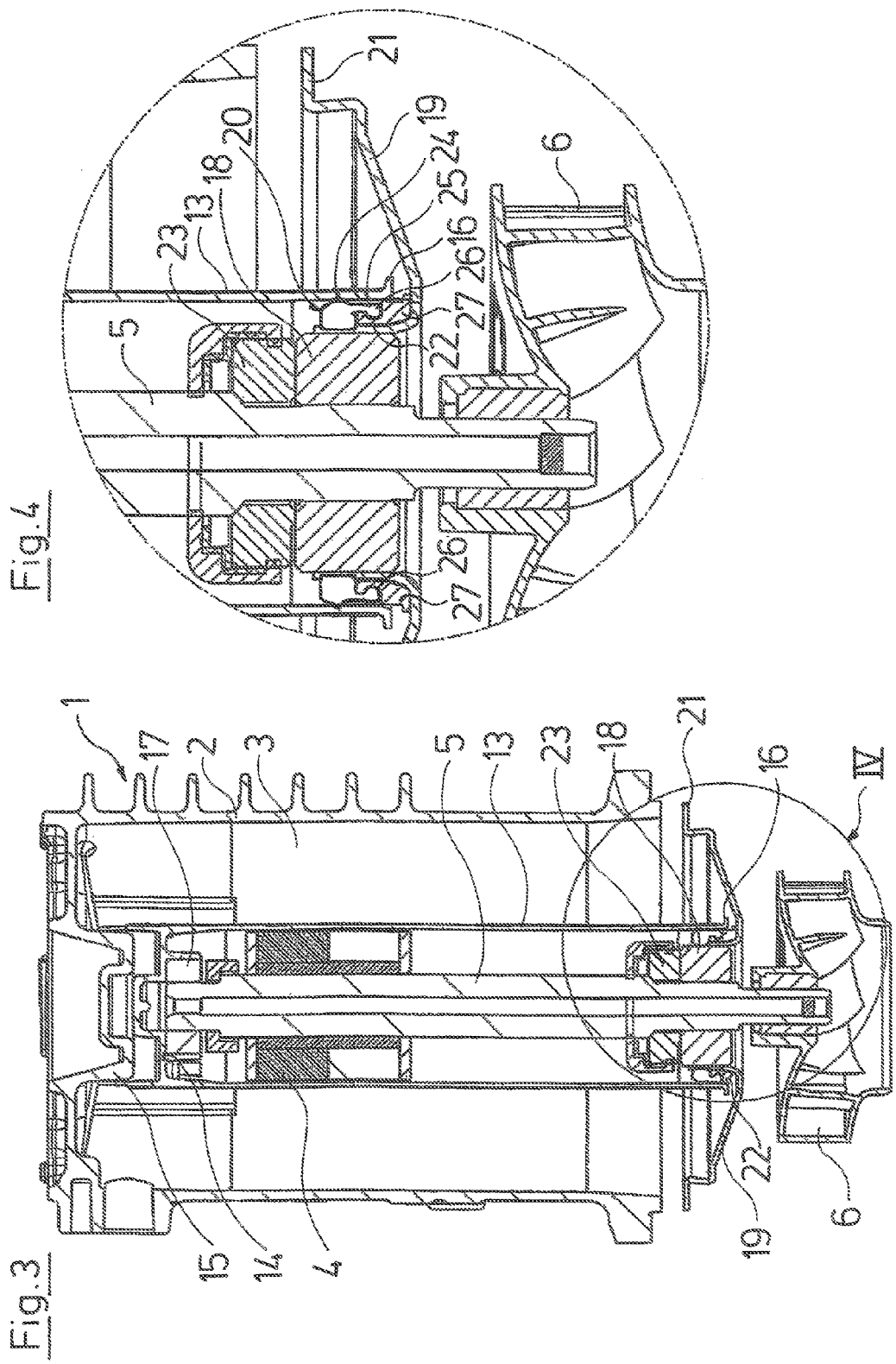

WET-RUNNING CENTRIFUGAL PUMP

CROSS REFERENCE TO RELATED APPLICATIONS

This application is a United States National Phase Application of International Application PCT/EP2012/076462 filed Dec. 20, 2012 and claims the benefit of priority under 35 U.S.C. §119 of European Patent Applications EP 11195636.3 filed Dec. 23, 2011 and EP12180810.9 filed Aug. 17, 2012, the entire contents of which are incorporated herein by reference.

FIELD OF THE INVENTION

The invention relates to a wet-running centrifugal pump with an electric motor and with a centrifugal pump which is driven thereby, wherein the electric motor comprises a rotor which is arranged within a stator, wherein a canned pot, which carries a motor-side bearing for the rotor is provided between the rotor and the stator, and with a bearing plate which carries a pump-side bearing for the rotor, wherein the bearing plate is fixed on the housing side.

BACKGROUND OF THE INVENTION

Such electromotorically driven centrifugal pumps, with which the rotor of the electric motor is separated from the stator by a can, in a multitude of construction variants, in particular for pump assemblies of a smaller or medium power, in many varieties, are counted as belonging to the state of the art. Thereby, the can which can be designed as a canned pot, on the one hand serves for the sealing of the stator with respect to the pump liquid, and on the other hand for receiving one or two bearings, with which the rotor is rotatably mounted. With such types of canned pumps, the rotor comprises a shaft which typically on the motor-side end of the can as well as in the region of a bearing plate arranged in the region between the pump and the motor, is rotatably mounted, and at its end distant to the motor is connected to an impeller, or, several impellers with multi-stage centrifugal pumps.

Thereby, with regard to centrifugal pumps, as are applied as heating circulation pumps for example, is counted as belonging to the state of the art, to design the can together with the bearing plate as one piece as a deep-drawn part in the form of a canned pot which is manufactured from stainless steel for example. Such canned pots have proven their worth in practice and are applied in a particularly advantageous manner in combination with asynchronous motors.

However, permanent magnet motors are better with regard to efficiency, with which metallic cans however are disadvantageous since they entail eddy current losses.

It is also counted as belonging to the state of the art, to apply a can between the rotor and the stator, in which can the rotor runs and which close to its ends in each case via a seal is sealed on the one hand with respect to the stator and on the other hand with respect to the bearing plate. Such a sealing on both sides however on the one hand requires quite some effort with regard to design and on the other hand is prone to disturbance and wear.

SUMMARY OF THE INVENTION

Against this background, it is the object of the invention to design a centrifugal pump of the initially mentioned type, such that this on the one hand is manufacturable as economically as possible and on the other hand runs in a stable and wear-free manner over a long time period with an as high as possible efficiency.

The wet-running centrifugal pump according to the invention comprises an electric motor and a centrifugal pump which is driven by this, wherein the electric motor has a rotor which is arranged within a stator, and a canned pot which carries a motor-side bearing for the rotor, is provided between the rotor and the stator. The wet-running centrifugal pump moreover comprises a bearing plate which carries a pump-side bearing for the rotor and is fixed on the housing side. Thereby, according to the invention, the arrangement and the design is such that the bearing plate immerses into the canned pot in the region of the bearing, and at least one radial seal is provided between the canned pot and the bearing plate.

The basic concept of the present invention is to design the can as a canned pot which per se is advantageous, but for reasons of stability and manufacturing technology, to design and arrange the bearing plate as a separate component in a manner such that this immerses into the canned pot in the region of the bearing. By way of this, one succeeds in roughly parallel annular surfaces being formed in the region of the bearing, specifically between the bearing plate and the canned pot, and in these surfaces being able to be sealed to one another in a simple manner by way of at least one radial seal. Hereby, it is the case of non-rotating, i.e. quasi rigid components which can be sealed to one another in a stable manner over the long-term, with simple sealing means, such as for example with one or more O-rings or a lip seal. This design according to the invention, thus to the motor-side end of the can provides an absolute and wear-free sealing between the rotor and the stator due to the formation of the pot. In contrast, a stable accommodation by the bearing plate is effected in the region of the bearing, and a reliable sealing between the bearing plate and the canned pot by way of the at least one radial seal. Due to the separation of the bearing plate and canned pot, the forces in the region of the canned pot which are produced by the fluid pressure are built up only via the transverse surface running perpendicularly to the longitudinal axis of the canned pot, i.e. in the base of the canned pot, and these forces can be accommodated by the motor housing, in particular the stator housing by way of a simple support. The forces on the bearing plate due to the pressure and which are greater on account of the larger surface are accommodated by this bearing plate itself, are not transmitted onto the canned pot and are conveyed by way of a suitable integration of the bearing plate into the housing structure.

A particularly advantageous design results by way of the canned pot being arranged in an axially floating manner. Axially floating in the context of the invention is to be understood in that the canned pot can displace by a certain amount in the axial direction. Such an arrangement on the one hand has advantages with regard to manufacturing technology, since the tolerances of the canned pot in the axial direction can be comparatively large and in operation ensures a free thermal expansion or displacement due to occurring pressure forces, and specifically independently of the applied material and without an influence on the sealedness of the arrangement which continues to be ensured by way of the at least one radial seal.

According to an advantageous further development of the invention, one envisages providing centering means within the stator or within the motor housing, said centering means leading the closed end of the canned pot on the housing side.

Such centering means can be formed by way of suitable guide ribs, a cone or likewise, which ensure that the closed end of the canned pot is led automatically into its correct central position within the stator. Since the canned pot is preferably mounted in a floating manner, this can be pushed so far into the preferably tapering centering means, until it is arranged in a centric and fixed manner.

The bearing plate can basically be fastened or integrated at any suitable location of the housing. However, it is particularly advantageous, with a housing which is divided into a motor housing and a pump housing, if the bearing plate is integrated between the motor housing and the pump housing. No additional fastening means are then necessary. In contrast, the bearing plate is fastened by the same connection, with which the housing parts are also fixed to one another, for example by a tie rod or a tension strap.

In order to hold the at least one radial seal within the annular gap between the bearing plate and the canned pot in a reliable and secure manner, according to one advantageous further development of the invention, a component, in particular a ring is provided, which is preferably arranged on the bearing plate side between the part, receiving the bearing, of the bearing plate, and the open end of the canned pot and which secures the at least one radial seal in at least one axial direction with a positive fit. Such a ring can for example be of plastic and be stuck on the bearing plate side for assembly purposes. Advantageously, such a ring is not only provided as a positive-fit securement for the radial seal, but moreover comprises holding means which connect the ring to the at least one radial seal and thus holds the at least one radial seal in its correct position. For this, the at least one radial seal advantageously comprises a holding section which engages with a positive fit into a corresponding holding recess of the ring. Thereby, the arrangement is advantageously designed such that the holding section, when the arrangement is not assembled, can be incorporated into the for example groove-like holding recess of the ring and is only secured with a positive fit in a direction other than the axial direction when the canned pot is pushed over.

The canned pot according to the invention can be manufactured from different materials which are suitable for the respective application purpose. In particular, with the application of a permanent magnet motor, it is particularly advantageous to manufacture the canned pot of plastic, preferably of fiber-reinforced plastic, in order to keep the eddy flow losses between the rotor and the stator as low as possible. Thereby, the fiber-reinforcement ensures the required strength.

The bearing plate in contrast, according to an advantageous further development of the invention, can be formed from a metallic material, preferably stainless steel. The forces caused by pressure which occur there can be securely accommodated by way of this. The shape part can also be manufactured inexpensively.

The canned pot, close to or at its open end advantageously comprises a preferably peripheral collar which extends outwards from the tubular body of the canned pot. Such a collar on the one hand increases the stability of the open end of the canned pot and on the other hand ensures that liquid possibly located in this region, which enters due to a leakage or condensation, is led away in a targeted manner, by way of its dripping away at this collar. This arrangement is particularly useful for a wet-running centrifugal pump assembly, which is envisaged and designed for arrangement with a horizontally arranged shaft and which in the motor housing preferably on the lower side comprises at least one opening for the discharge of liquid. Such a liquid discharge opening is usefully designed as a labyrinth channel, in order to ensure that no water which splashes onto the housing from the outside can penetrate into this. In particular, with wet-running centrifugal pumps of a medium construction size, it is usual to design these such that the position of installation is set on account of the design. In practice, numerous advantages result from this.

The liquid discharge opening is advantageously arranged in the region, in which the collar of the canned pot also lies, so that liquid dripping away there can be led away in an as direct as possible path out of the housing through the opening which is advantageously provided there.

Particularly advantageously, the electric motor of the wet-running centrifugal pump is a permanent magnet motor, preferably a permanent magnet motor controlled by a speed controller. By way of this, a particularly high efficiency is achieved in combination with a canned pot consisting of plastic. The activation by way of a speed controller permits a comparatively small construction size of the assembly with a high hydraulic power and moreover also increases the effectiveness of the assembly.

The at least one radial seal is advantageously designed as a lip seal, i.e. it comprises a sealing lip which is directed radially to the tubular part of the canned pot, and a radially inwardly directed, surfaced sealing seat which bears in a surfaced manner on the bearing plate, in particular on a cylindrical section of the bearing plate. Such a seal arrangement ensures that with axial displacements between the bearing plate and the canned pot, be it due to thermal expansion or other influences, the canned pot slides past the lip and thereby the seal remains on the sealing seat on the bearing plate in a defined manner and thus ensures a defined and reliable sealing.

Instead of such a sealing ring with a sealing lip, two or more such sealing rings can be arranged one after the other in the axis direction, in order to ensure that no fluid penetrates, even given the failure of a seal. Such a sealing can also be formed by an arrangement of one or more O-rings which lie axially one after the other, wherein in each case a peripheral groove is usefully provided as a sealing seat, either on the can side or bearing plate side.

Advantageously, the tubular part of the canned pot is lengthened or extended beyond the pot base. Such an extension is particularly favorable with regard to manufacturing technology, particularly with a fiber-reinforced canned pot. The fiber reinforcement can also then be effected in the region which is extended beyond the pot base. This extended region forms a part of the centering means and is accordingly supplemented on the stator side, typically by a centering cone or however by centering ribs which engage on the end of the canned pot on the inside and/or outside. The bearing plate which receives the pump-side bearing of the rotor, according to an advantageous further development of the invention, is provided with a hollow-cylindrical section which on the inside receives the bearing and on whose outer side the radial seal bears, advantageously with a surfaced sealing seat. Such a hollow-cylindrical section can be inexpensively manufactured from a sheet metal section by way of plastic deformation, and can be machined in a material-removing manner as the case may be, on the inner side for receiving the bearing and on the outer side for creating the sealing seat. Such a hollow-cylindrical section can, as the case may be, also be formed as a turned component from a tube section and be connected to the remaining part of the bearing plate by way of welding.

The invention is hereinafter explained in more detail by way of one embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a view of a wet-running centrifugal pump according to the invention, in the direction of the rotation axis of the rotor, from the motor side;

FIG. 2 is a sectional view along the section line II-II in FIG. 1;

FIG. 3 is an enlarged longitudinal sectional representation through the motor;

FIG. 4 is a detail view IV in FIG. 3, in an enlarged representation;

DESCRIPTION OF THE PREFERRED EMBODIMENTS

Figure 6:
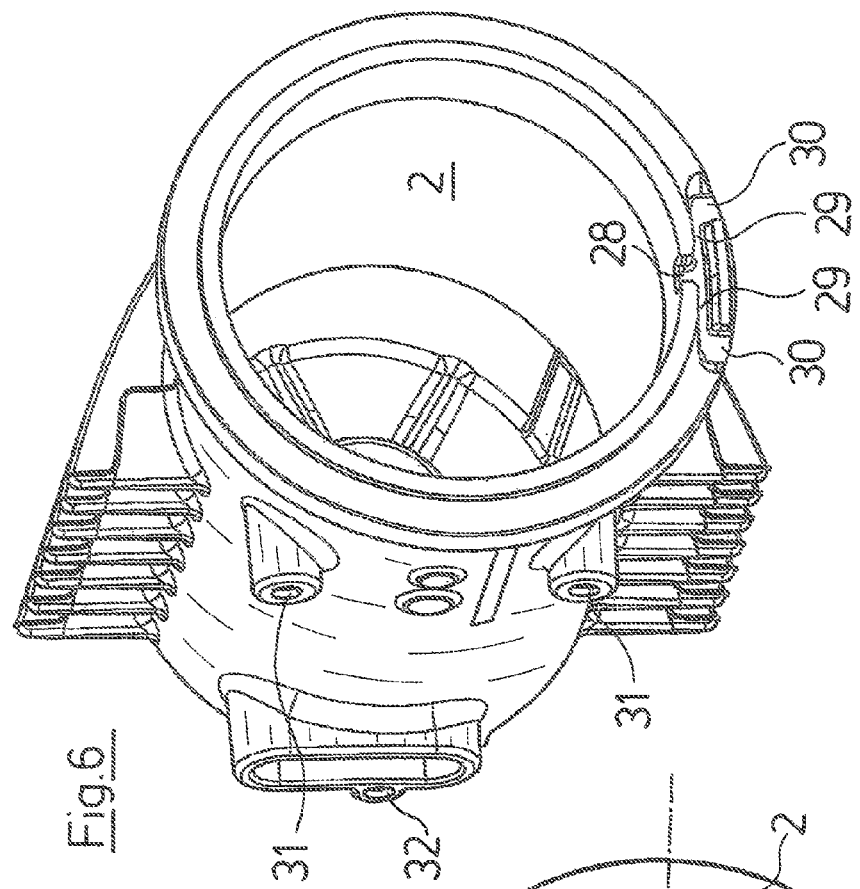
FIG. 6 is a perspective view of the motor housing.
Figure 5:
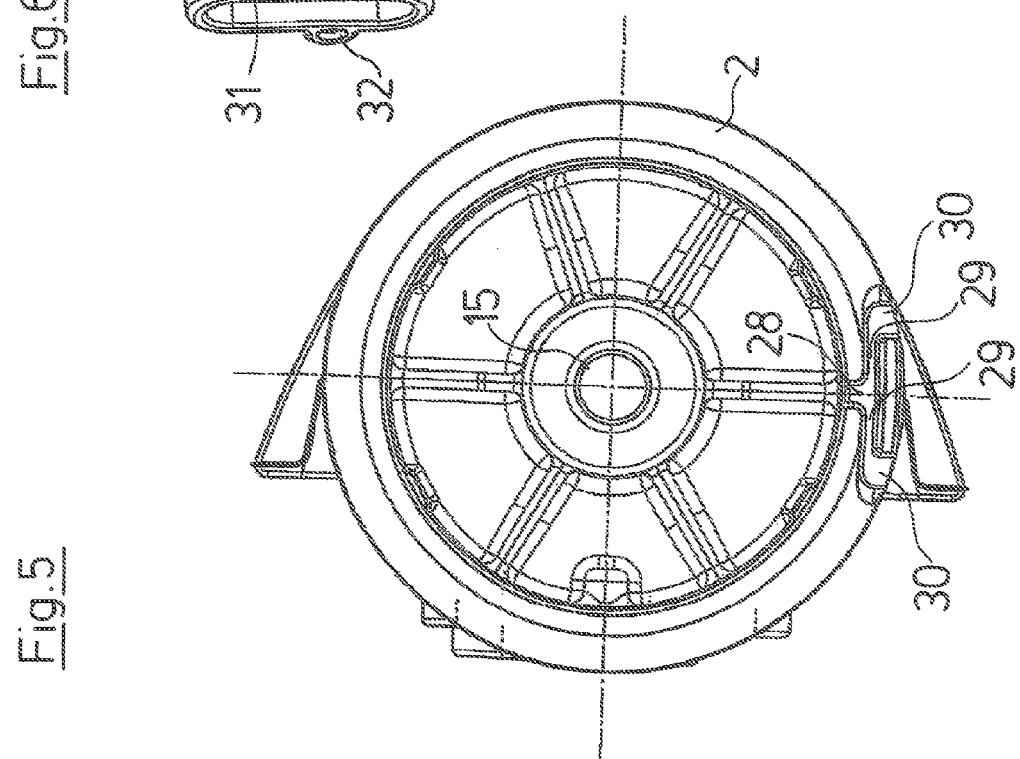
FIG. 5 is a view of the motor housing, from the side facing the pump housing.
Figure 7:
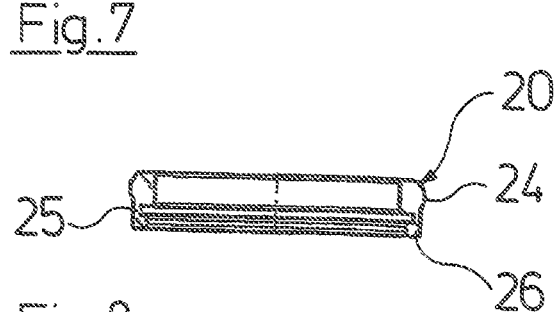
FIG. 7 is a sectional view through a radial seal.
Figure 8:
FIG. 8 is a sectional view through a holding ring for the radial seal.
Figure 9:
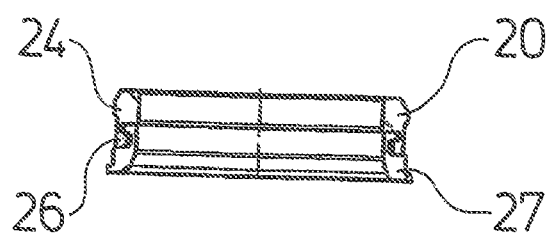
FIG. 9 is a sectional view through the holding ring and radial seal, in the joined-together condition.

Referring to the drawings in particular, the represented wet-running centrifugal pump comprises an electric motor 1 with a motor housing 2 which receives a stator 3, in which a rotor 4 is rotatably mounted, said rotor comprising a shaft 5, on whose pump-side end an impeller 6 of a centrifugal pump 7 driven by this electric motor 1 is arranged.

The centrifugal pump 7 comprises a pump housing 8 which in the represented embodiment is designed as an inline housing, and a suction connection 9 as well as a pressure connection 10 which are connected via a spiral housing 11, in which the impeller 6 is arranged in the usual manner.

The electric motor 1 and the centrifugal pump 7 are connected to one another via housing flanges which, with the represented embodiment, are held together with a positive-fit and non-positive fit by way of a clamping ring 12.

The pump assembly consisting of the electric motor 1 and centrifugal pump 7 is designed as a wet-runner, i.e. the rotor 4 of the electric motor 1 runs in a fluid which is separated by a can, here in the form of a canned pot 13, from the stator 3 having the electric connections and components. The canned pot 13 has a longitudinally extended cylindrical shape and has a base 14 close to its motor-side end. The cylindrical body of the canned pot 13 is continued beyond the base 14 and there forms part of a centering aid, whose other part is formed by an axially inwardly projecting, cone-shaped housing part 15 of the motor housing 2 which is partly covered by the tubular part, projecting beyond the base 14, of the canned pot 13 and in this manner guides and centers the motor-side end of the canned pot 13 with respect to the motor housing 2. Moreover, the canned pot 13 on its pump-side end comprises a peripheral and radially outwardly projecting collar 16 which reinforces the pot structure at the upper end and simultaneously serves for leading away liquid collecting there, in a targeted manner. The canned pot 13 consists of plastic and is fiber-reinforced in the present embodiment by way of reinforcement fibers wound in a helical manner around the cylindrical part of the pot. The can, which separates the stator 3 with the stator windings not represented individually, with respect to the rotor 4 equipped with permanent magnets, because it is of plastic, only produces minimal eddy current losses and thus further increases the already high efficiency of the permanent magnet motor.

A motor-side bearing 17 for the shaft 3 comprising a central longitudinal bore is provided within the canned pot close to the base 14. A further, pump-side bearing 18 mounts the shaft 5 in the region between the motor-side part and the impeller 6. The pump-side bearing 18 is arranged in a bearing plate 19 which is incorporated between the flanges of the motor housing 2 and the pump housing 8 with a positive fit and in a sealed manner, and which together with the canned pot 13 and a radial seal 20 integrated therebetween, hermetically separates the pump housing 8 with respect to the motor housing 2, in particular the part of the motor housing 2 which receives the stator 3.

The bearing plate 19 is formed from stainless steel and extends from its peripheral flange 21 radially inwards and running obliquely into the pump housing 8, in order to then extend with a hollow-cylindrical section 22 up to into the pump-side end of the canned pot 3. The pump-side bearing 18 which is a combined thrust bearing/radial bearing, is accommodated in the region of this hollow-cylindrical section 22. The thrust bearing/radial bearing, in which the shaft 5 is rotatably mounted, is fixed within the hollow-cylindrical section 22. A thrust bearing is formed by a motor-side end-face of the radial bearing in combination with a counter bearing 23 arranged on the shaft 5 in a rotationally fixed manner. This thrust bearing serves for accommodating the hydraulically caused axial forces of the pump.

The outer side of the hollow-cylindrical section 22 forms a surfaced annular sealing seat for the cylindrical inner surface of the radial seal 20, whose outer surface is formed by a radially projecting sealing lip 24 which bears on the inner side of the canned pot 13. As FIGS. 3 and 4 illustrate, the canned pot 13 does not reach up to the bearing plate 19, but ends at a distance thereto, so that this is mounted in a floating manner, thus can move, expand and displace in the axial direction, wherein the sealing lip 24 ensures that a reliable sealing between the canned pot 13 and the bearing plate 19 is always given.

The radial seal 20 consists of the actual peripheral seal which is essentially rectangular in cross section and has the radially outwardly pointing sealing lip 24. It comprises a likewise annularly peripheral holding section 26 which connects axially via a peripheral web 25 and engages into a peripheral groove of a holding ring 27 consisting of plastic, said holding ring, as illustrated by FIG. 4, being integrated in the region between the hollow-cylindrical section 22, the remaining bearing plate 19 and the pump-side end of the canned pot 13. As FIG. 4 illustrates, the holding section 26, when this lies in the groove of the holding ring 27, is held in the installed position with a positive fit by the surrounding components.

In contrast to FIG. 2, the radial seal is represented in FIGS. 3 and 4 in the uncompressed form. Indeed, this seal 20 in the installed position is integrated between the hollow-cylindrical section 22 and the likewise hollow-cylinder-shaped inner side of the canned pot 13, as is represented in FIG. 2.

The peripheral collar 16 not only serves for stabilizing the pump-side end of the canned pot 13 but moreover also as a drip edge for the discharge of liquid which has possibly collected there. Since the pump is designed and envisaged for operation with a horizontal shaft, thus as is represented in FIG. 1, the motor housing in its flange region on its lower side comprises an opening 28 for the discharge of the fluid which drops downwards at the collar 16 in the installed position. The opening 28 is led within the motor housing via labyrinth channels 29 in two openings 30 on the lower side of the motor housing. In this manner, it is ensured that splashing water directed from the outside onto the motor housing cannot penetrate to the inside.

With regard to the pump assembly represented in FIGS. 1 and 2, a terminal box which is arranged on the motor housing 2 and which also comprises a frequency converter provided for the control of the speed of the motor, is not represented, Moreover, the connections for the terminal box which is not represented, are visible in FIG. 6, specifically two screw connections 31 and a central connection 32 close to the end of the motor housing 2, on which on the one hand a screw fastening is effected and on the other hand the feed-through of the connection conduits.

While specific embodiments of the invention have been shown and described in detail to illustrate the application of the principles of the invention, it will be understood that the invention may be embodied otherwise without departing from such principles.

The invention claimed is:
1. A wet-running centrifugal pump comprising:
an electric motor comprising a rotor and a stator;
a centrifugal pump driven by the electric motor, wherein the rotor is arranged within the stator;
a canned pot, which carries a motor-side bearing for the rotor, provided between the rotor and the stator, the canned pot being arranged in an axially floating manner, the canned pot being formed of fiber-reinforced plastic, the canned pot having a constant cross section and a bearing seat arranged on an inner side of a bottom of the canned pot;
a bearing plate, which carries a pump-side bearing, for the rotor, fixed on a housing side, wherein the bearing plate, in the region of the pump-side bearing, immerses into the canned pot, the bearing plate being formed of metallic material;
a centering means on the housing side to guide the closed end of the canned pot, the centering means being arranged on an outer side of the bottom of the canned pot;
at least one radial seal provided between the canned pot and the bearing plate; and
a ring component provided on the bearing plate side and being arranged between a part of the bearing plate which receives the pump-side bearing, and the open end of the canned pot, said ring component securing the at least one radial seal with a positive fit in the axial direction, the canned pot, at or adjacent to the open end, comprising a peripheral collar, wherein a portion of the ring component extends outside of the peripheral collar.

2. A wet-running pump according to claim 1, wherein a housing comprises a motor housing and a pump housing, the bearing plate being integrated between the motor housing and the pump housing, wherein a portion of the canned pot extends beyond the bearing seat when the bearing seat is mounted to the centering means.

3. A wet-running pump according to claim 1, wherein the at least one radial seal is formed by a radial sealing ring comprising a holding section which is integrated with a positive fit in a corresponding holding recess of the ring component.

4. A wet-running pump according to claim 1, wherein the canned pot, at or adjacent to the open end, comprises the peripheral collar which extends outwards from a tubular body of the canned pot.

5. A wet-running pump according to claim 1, wherein:
a housing comprises a motor housing and a pump housing; and
the pump operates with a horizontally arranged shaft and at least one opening for the discharge of fluid is provided in the motor housing.

6. A wet-running pump according to claim 5, wherein the at least one opening is arranged axially in the region, in which the peripheral collar of the can also lies.

7. A wet-running pump according to claim 1, wherein the electric motor is a permanent magnet motor controlled by a speed controller.

8. A wet-running pump according to claim 1, wherein the at least one radial seal comprises a sealing lip directed radially to a tubular part of the canned pot and comprises a radially inwardly directed, surfaced sealing seat on the bearing plate.

9. A wet-running pump according to claim 1, wherein a tubular part of the canned pot is extended beyond a canned pot base.

10. A wet-running pump according to claim 1, wherein the bearing plate has a hollow-cylindrical section which, on an inside accommodates the pump-side bearing and the radial seal engages an outer side of the hollow-cylindrical section.

11. A wet-running centrifugal pump comprising: a housing; an electric motor comprising a rotor and a stator, wherein the rotor is arranged within the stator; a centrifugal pump operatively connected to the electric motor; a canned pot comprising a constant cross section, a tubular portion and a portion defining a motor-side bearing for the rotor, the canned pot comprising a canned pot first end and a canned pot second end, said canned pot first end being located opposite said canned pot second end with respect to an axial direction of the canned pot, the canned pot not being fixedly restrained in the axial direction, wherein the canned pot is movable relative to the housing and the stator, the tubular portion comprising a bearing seat, the housing comprising a housing part, the housing part cooperating with the bearing seat to center the canned pot in the housing; a bearing plate with a portion defining a pump-side bearing for the rotor, the bearing plate being fixed to the housing, the bearing plate having a portion in a region of the pump-side bearing that extends into the canned pot, the canned pot second end being located at a spaced location from the bearing plate, wherein the canned pot first end is movable in the axial direction relative to the housing and the canned part second end is movable in the axial direction relative to the bearing plate, the housing comprising a motor housing and a pump housing, the bearing plate being fixed to the housing by integrating a portion of the bearing plate between the motor housing and the pump housing at an interface between the motor housing and the pump housing; at least one radial seal between the canned pot and the bearing plate; and a ring component arranged between a part of the bearing plate which receives the pump-side bearing, and an open end of the canned pot, said ring component securing the at least one radial seal with a positive fit in an axial direction, the canned pot, at or adjacent to the open end, comprising a peripheral collar, wherein a portion of the ring component extends outside of the peripheral collar.

12. A wet-running pump according to claim 11, wherein the canned pot comprises a fiber-reinforced plastic.

13. A wet-running pump according to claim 12, wherein the bearing plate comprises a metallic material.

14. A wet-running pump according to claim 13, wherein the housing part is located opposite said canned pot first end, the canned pot comprising a canned pot base portion, the canned pot base portion comprising the bearing seat, the tubular portion comprising a tubular end portion, said tubular end portion defining at least a portion of said canned pot first end, the tubular end portion extending to a position beyond a position of the canned pot base portion when the tubular end portion cooperates with the housing part to center the canned pot in the housing, the tubular end portion extending about a periphery of said housing part.

15. A wet-running centrifugal pump comprising:
a housing comprising a housing part;
an electric motor comprising a rotor and a stator, wherein the rotor is arranged within the stator;
a centrifugal pump operatively connected to the electric motor;
a canned pot comprising a tubular portion and a portion defining a motor-side bearing for the rotor, the tubular portion comprising a tubular first end portion and a tubular second end portion, the tubular first end portion being located opposite the housing part, the tubular first end portion being located opposite said tubular second end portion with respect to an axial direction of the canned pot;
a bearing plate with a portion defining a pump-side bearing for the rotor, the tubular second end portion being movably connected to the pump-side bearing such that the tubular second end portion is movable in the axial direction relative to the bearing plate and the tubular first end portion is movable in the axial direction relative to the housing part, wherein the canned pot is movable relative to the stator and the housing, the bearing plate being fixed to the housing, the bearing plate having a portion in a region of the pump-side bearing that extends into the canned pot, the canned pot comprising a constant cross section and a canned pot bearing seat, the tubular first end portion extending to a position beyond a position of the canned pot bearing seat when the canned pot bearing seat is mounted to the housing part to center the canned pot in the housing, the canned pot comprising a fiber-reinforced plastic, the bearing plate comprising a metallic material;
a radial seal between the canned pot and the bearing plate; and
a ring component arranged between a portion of the bearing plate which receives the pump-side bearing, and an open end of the canned pot, the ring component securing the radial seal with a positive fit in the axial direction, the canned pot, at or adjacent to the open end, comprising a peripheral collar, wherein a portion of the ring component extends outside of the peripheral collar, wherein the tubular first end portion extends about a periphery of said housing part, the housing comprising a housing interior space, said tubular first end portion being located in said housing interior space.

* * * * *